United States Patent
Edwards (10) Patent No.: US 12,500,441 B2
(45) Date of Patent: *Dec. 16, 2025

(54) SOLAR HYBRID BATTERY FOR POWERING NETWORK DEVICES OVER EXTENDED TIME INTERVALS

(71) Applicant: ITRON, INC., Liberty Lake, WA (US)

(72) Inventor: Bruce Edwards, San Jose, CA (US)

(73) Assignee: ITRON, INC., Liberty Lake, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/695,677

(22) Filed: Mar. 15, 2022

(65) Prior Publication Data
US 2022/0209570 A1 Jun. 30, 2022

Related U.S. Application Data

(63) Continuation of application No. 16/237,554, filed on Dec. 31, 2018, now Pat. No. 11,296,539.

(51) Int. Cl.
| | |
|---|---|
| *H02J 7/00* | (2006.01) |
| *H02J 7/34* | (2006.01) |
| *H02J 7/35* | (2006.01) |
| *H04W 52/02* | (2009.01) |

(52) U.S. Cl.
CPC .............. *H02J 7/35* (2013.01); *H02J 7/0068* (2013.01); *H02J 7/342* (2020.01); *H04W 52/0296* (2013.01)

(58) Field of Classification Search
CPC ................................. H02J 7/0068; H02J 7/35
USPC ........................................................ 320/101
See application file for complete search history.

(56) References Cited

U.S. PATENT DOCUMENTS

| | | | | |
|---|---|---|---|---|
| 4,243,928 A | * | 1/1981 | Nazimek | H02J 7/35 320/101 |
| 4,476,853 A | | 10/1984 | Arbogast | |
| 4,494,854 A | | 1/1985 | Yamaga et al. | |
| 4,667,142 A | | 5/1987 | Butler | |
| 5,039,928 A | * | 8/1991 | Nishi | H02J 7/35 361/679.55 |

(Continued)

FOREIGN PATENT DOCUMENTS

| | | |
|---|---|---|
| CN | 103139936 A | 6/2013 |
| CN | 103338532 A | 10/2013 |

(Continued)

OTHER PUBLICATIONS

"How much solar irradiance do clouds block from reaching the Earth's surface?", Gerrit, physics.stackexchange.com, Jul. 2022, https://physics.stackexchange.com/questions/717769/how-much-solar-irradiance-do-clouds-block-from-reaching-the-earths-surface (Year: 2022).*

(Continued)

*Primary Examiner* — John T Trischler
(74) *Attorney, Agent, or Firm* — Artegis Law Group, LLP (57) ABSTRACT

A network device for installation at a geographic location includes a rechargeable power cell configured to store a first amount of energy sufficient to power the network device during a longest night of a year at the geographic location without the rechargeable power cell being fully depleted and a solar panel configured to generate a second amount of energy sufficient to, during any given cloudy day at the geographic location, power the network device and fully recharge the rechargeable power cell.

14 Claims, 5 Drawing Sheets

(56) References Cited

U.S. PATENT DOCUMENTS

| | | | |
|---|---|---|---|
| 5,387,858 A | 2/1995 | Bender et al. | |
| 5,411,537 A | 5/1995 | Munshi et al. | |
| 5,920,827 A | 7/1999 | Baer et al. | |
| 5,950,124 A * | 9/1999 | Trompower | H04W 28/18 |
| | | | 455/571 |
| 5,998,052 A | 12/1999 | Yamin | |
| 6,127,797 A | 10/2000 | Walker | |
| 6,128,512 A * | 10/2000 | Trompower | H04B 1/707 |
| | | | 455/524 |
| 6,204,636 B1 | 3/2001 | Kinoshita et al. | |
| 6,763,237 B1 | 7/2004 | Katz | |
| 6,813,897 B1 | 11/2004 | Bash et al. | |
| 7,038,333 B2 | 5/2006 | Bourilkov et al. | |
| 7,309,850 B2 * | 12/2007 | Sinton | H02S 50/10 |
| | | | 250/214 R |
| 7,333,916 B2 * | 2/2008 | Warfield | H02S 50/10 |
| | | | 702/182 |
| 7,345,371 B1 | 3/2008 | Kuelbs | |
| 7,518,253 B2 | 4/2009 | Kuelbs | |
| 7,615,962 B1 | 11/2009 | Kuelbs | |
| 7,688,222 B2 | 3/2010 | Peddie et al. | |
| 7,688,778 B2 | 3/2010 | Ogushi | |
| 7,733,224 B2 * | 6/2010 | Tran | A43B 3/48 |
| | | | 340/8.1 |
| 7,760,109 B2 | 7/2010 | Broad et al. | |
| 7,770,324 B2 * | 8/2010 | Hogan | A01G 9/022 |
| | | | 47/79 |
| 7,772,798 B2 | 8/2010 | Rodas et al. | |
| 7,825,615 B2 | 11/2010 | Chen et al. | |
| 7,830,110 B1 | 11/2010 | Kuelbs | |
| 7,859,431 B2 | 12/2010 | Peddie et al. | |
| 7,881,212 B2 * | 2/2011 | Kutschenreuter | H04L 45/123 |
| | | | 370/248 |
| 8,035,337 B1 | 10/2011 | Oakenfull | |
| 8,101,848 B2 * | 1/2012 | Kelly | H02S 20/32 |
| | | | 136/246 |
| 8,129,850 B2 | 3/2012 | Kuelbs et al. | |
| 8,149,717 B2 | 4/2012 | Gossain et al. | |
| 8,188,878 B2 | 5/2012 | Pederson et al. | |
| 8,390,244 B2 | 3/2013 | Wooley et al. | |
| 8,421,252 B1 | 4/2013 | Kuelbs et al. | |
| 8,421,401 B2 | 4/2013 | Wen | |
| 8,422,256 B2 | 4/2013 | Giuntini et al. | |
| 8,461,988 B2 * | 6/2013 | Tran | A61B 5/1117 |
| | | | 340/3.1 |
| 8,525,441 B2 | 9/2013 | Shuy et al. | |
| 8,525,673 B2 * | 9/2013 | Tran | A61B 5/7264 |
| | | | 340/3.1 |
| 8,525,687 B2 * | 9/2013 | Tran | A61B 8/00 |
| | | | 340/506 |
| 8,531,291 B2 * | 9/2013 | Tran | H04M 3/5116 |
| | | | 340/3.1 |
| 8,588,830 B2 | 11/2013 | Myer et al. | |
| 8,618,934 B2 | 12/2013 | Belov et al. | |
| 8,680,991 B2 * | 3/2014 | Tran | G16Z 99/00 |
| | | | 340/3.1 |
| 8,707,075 B2 | 4/2014 | Broad et al. | |
| 8,716,889 B2 | 5/2014 | Vaidyanathan | |
| 8,720,836 B2 * | 5/2014 | Hogan | A47G 7/044 |
| | | | 40/606.14 |
| 8,747,336 B2 * | 6/2014 | Tran | A61B 5/0077 |
| | | | 600/595 |
| 8,780,593 B2 * | 7/2014 | Wang | H02M 1/42 |
| | | | 363/71 |
| 8,787,392 B2 | 7/2014 | Vasseur et al. | |
| 8,803,362 B2 | 8/2014 | Schmiegel | |
| 8,811,234 B2 | 8/2014 | Gossain et al. | |
| 8,896,151 B2 | 11/2014 | Yamane et al. | |
| 8,901,411 B2 | 12/2014 | Liu et al. | |
| 8,902,076 B2 | 12/2014 | Pederson et al. | |
| 8,929,228 B2 | 1/2015 | Budampati et al. | |
| 8,941,252 B1 | 1/2015 | Kuelbs et al. | |
| 8,970,394 B2 | 3/2015 | Veillette | |
| 9,019,122 B2 | 4/2015 | Heller | |
| 9,086,686 B2 | 7/2015 | Kojima et al. | |
| 9,087,338 B2 | 7/2015 | Levine et al. | |
| 9,090,253 B2 | 7/2015 | Flath et al. | |
| 9,103,567 B2 | 8/2015 | Dwyer et al. | |
| 9,167,516 B2 | 10/2015 | Arendas | |
| 9,204,796 B2 * | 12/2015 | Tran | A61B 5/369 |
| 9,236,751 B2 | 1/2016 | Goei et al. | |
| 9,300,581 B1 | 3/2016 | Hui et al. | |
| 9,344,365 B1 | 5/2016 | Hui et al. | |
| 9,351,228 B2 * | 5/2016 | Hui | H04L 45/124 |
| 9,351,640 B2 * | 5/2016 | Tran | A61B 5/6807 |
| 9,353,973 B2 * | 5/2016 | Almogy | F24S 40/55 |
| 9,369,374 B1 | 6/2016 | Hui et al. | |
| 9,385,953 B1 | 7/2016 | Hui et al. | |
| 9,413,457 B2 | 8/2016 | Pederson et al. | |
| 9,442,742 B2 * | 9/2016 | Gourlay | G06F 9/4416 |
| 9,465,078 B2 | 10/2016 | Betzner | |
| 9,491,122 B2 * | 11/2016 | Morrison | H04L 45/22 |
| 9,568,522 B2 | 2/2017 | Aiello et al. | |
| 9,581,972 B1 | 2/2017 | Arrow et al. | |
| 9,621,462 B2 | 4/2017 | Hui et al. | |
| 9,655,207 B2 | 5/2017 | Monaci et al. | |
| 9,730,136 B2 * | 8/2017 | Hui | H04W 40/02 |
| 9,732,899 B2 * | 8/2017 | Hogan | A47G 7/044 |
| 9,775,520 B2 * | 10/2017 | Tran | G08B 21/0492 |
| 9,780,567 B2 | 10/2017 | Hunt et al. | |
| 9,788,400 B2 | 10/2017 | Flinsenberg et al. | |
| 9,839,088 B1 | 12/2017 | Deaton | |
| 9,843,286 B2 | 12/2017 | Sills et al. | |
| 9,847,944 B2 | 12/2017 | Chow et al. | |
| 9,889,915 B2 | 2/2018 | Zhang et al. | |
| 9,893,985 B2 | 2/2018 | Hui et al. | |
| 9,901,252 B2 * | 2/2018 | Tran | A61B 5/6824 |
| 9,973,487 B2 * | 5/2018 | Ujiie | H04L 12/4625 |
| 10,006,666 B2 | 6/2018 | Tamaura | |
| 10,044,188 B2 * | 8/2018 | Metcalfe | H02J 3/16 |
| 10,070,155 B2 * | 9/2018 | Panagos | H04N 21/2225 |
| 10,209,283 B2 | 2/2019 | Aiello et al. | |
| 10,284,005 B2 * | 5/2019 | Jiang | H02J 7/35 |
| 10,307,060 B2 * | 6/2019 | Tran | A61B 8/488 |
| 10,313,967 B2 | 6/2019 | Chandra et al. | |
| 10,359,797 B2 | 7/2019 | Carlson | |
| 10,362,940 B2 * | 7/2019 | Tran | A61B 5/0013 |
| 10,455,395 B2 | 10/2019 | Gharabegian | |
| 10,514,140 B2 | 12/2019 | Sreshta et al. | |
| 10,517,479 B2 * | 12/2019 | Tran | A61B 5/6826 |
| 10,539,964 B2 | 1/2020 | Minorics | |
| 10,567,280 B2 | 2/2020 | Hui et al. | |
| 10,594,145 B1 | 3/2020 | Wang et al. | |
| 10,608,962 B2 | 3/2020 | Edwards | |
| 10,612,738 B1 | 4/2020 | Sreshta et al. | |
| 10,647,449 B2 | 5/2020 | Wasson et al. | |
| 10,687,228 B2 | 6/2020 | Gardner | |
| 10,701,615 B2 * | 6/2020 | Grayson | H04L 43/0882 |
| 10,718,500 B1 | 7/2020 | Tylicki et al. | |
| 10,724,723 B2 * | 7/2020 | Johnson | H05B 47/115 |
| 10,727,682 B2 | 7/2020 | Park et al. | |
| 10,739,769 B2 * | 8/2020 | Dean | G05D 1/81 |
| 10,785,719 B2 | 9/2020 | Chandra et al. | |
| 11,057,650 B2 * | 7/2021 | Panagos | H04L 45/033 |
| 11,146,066 B2 * | 10/2021 | Metcalfe | H02J 3/16 |
| 11,172,423 B2 * | 11/2021 | Edwards | H04L 45/30 |
| 11,184,831 B2 * | 11/2021 | Edwards | H04W 40/12 |
| 11,211,796 B2 * | 12/2021 | Metcalfe | G01R 29/18 |
| 11,296,539 B2 * | 4/2022 | Edwards | H02J 7/342 |
| 11,334,070 B2 * | 5/2022 | Dean | G05D 1/0088 |
| 11,403,833 B2 * | 8/2022 | Fukutome | H04N 25/75 |
| 11,489,339 B2 * | 11/2022 | Metcalfe | H02J 3/16 |
| 11,557,155 B2 * | 1/2023 | Gong | G08G 1/052 |
| 11,616,368 B2 * | 3/2023 | Lee | H02M 3/33584 |
| | | | 320/140 |
| 11,800,428 B2 * | 10/2023 | Edwards | H04W 40/10 |
| 12,158,758 B2 * | 12/2024 | Dean | G05D 1/81 |
| 2003/0155887 A1 | 8/2003 | Bourilkov et al. | |
| 2005/0257827 A1 | 11/2005 | Gaudiana et al. | |
| 2005/0270175 A1 | 12/2005 | Peddie et al. | |
| 2006/0002368 A1 | 1/2006 | Budampati et al. | |
| 2006/0039316 A1 | 2/2006 | Ogushi | |

(56) References Cited

U.S. PATENT DOCUMENTS

| | | |
|---|---|---|
| 2006/0085167 A1* | 4/2006 | Warfield ............... H02S 50/10 |
| | | 702/188 |
| 2006/0187656 A1 | 8/2006 | Kuelbs et al. |
| 2006/0204795 A1 | 9/2006 | Schulman |
| 2006/0220843 A1 | 10/2006 | Broad et al. |
| 2007/0029468 A1* | 2/2007 | Sinton ................. H02S 50/10 |
| | | 250/214 R |
| 2007/0084502 A1* | 4/2007 | Kelly .................. F24S 50/20 |
| | | 136/246 |
| 2007/0097873 A1 | 5/2007 | Ma et al. |
| 2008/0001735 A1 | 1/2008 | Tran |
| 2008/0111424 A1 | 5/2008 | Yeh |
| 2008/0112316 A1 | 5/2008 | Charny et al. |
| 2008/0115414 A1* | 5/2008 | Hogan .................. A01G 9/022 |
| | | 47/66.6 |
| 2008/0191491 A1 | 8/2008 | Kuelbs |
| 2008/0243079 A1 | 10/2008 | Wooley et al. |
| 2008/0246339 A1 | 10/2008 | Rodas et al. |
| 2008/0298251 A1 | 12/2008 | Khuu et al. |
| 2008/0310850 A1 | 12/2008 | Pederson et al. |
| 2009/0029645 A1 | 1/2009 | Leroudier |
| 2009/0090895 A1* | 4/2009 | Hogan, Jr. ............ A01G 9/022 |
| | | 254/1 |
| 2009/0096399 A1 | 4/2009 | Chen et al. |
| 2009/0099761 A1* | 4/2009 | Davis ................ G08G 5/0026 |
| | | 701/120 |
| 2009/0173375 A1 | 7/2009 | Frazier et al. |
| 2009/0232014 A1 | 9/2009 | Kutschenreuter et al. |
| 2009/0236911 A1 | 9/2009 | Carroll |
| 2009/0256723 A1 | 10/2009 | Peddie et al. |
| 2010/0029268 A1 | 2/2010 | Myer et al. |
| 2010/0057267 A1 | 3/2010 | Liu et al. |
| 2010/0060231 A1 | 3/2010 | Trainor et al. |
| 2010/0231386 A1 | 9/2010 | Barnes |
| 2010/0253090 A1 | 10/2010 | Kuelbs et al. |
| 2010/0271199 A1 | 10/2010 | Belov et al. |
| 2010/0303005 A1 | 12/2010 | Gossain et al. |
| 2011/0080044 A1 | 4/2011 | Schmiegel |
| 2011/0115624 A1* | 5/2011 | Tran ................... A61B 5/6807 |
| | | 340/540 |
| 2011/0127958 A1 | 6/2011 | Ishishita et al. |
| 2011/0156634 A1 | 6/2011 | Lai |
| 2011/0181422 A1* | 7/2011 | Tran ................... A61B 5/002 |
| | | 340/573.1 |
| 2011/0234148 A1 | 9/2011 | Wen |
| 2011/0271999 A1* | 11/2011 | Almogy ................. F24S 40/55 |
| | | 136/246 |
| 2011/0291483 A1 | 12/2011 | Yamane et al. |
| 2011/0295575 A1 | 12/2011 | Levine et al. |
| 2011/0308574 A1 | 12/2011 | Vaidyanathan |
| 2012/0007441 A1 | 1/2012 | John |
| 2012/0020060 A1 | 1/2012 | Myer et al. |
| 2012/0026764 A1 | 2/2012 | Giuntini et al. |
| 2012/0092156 A1* | 4/2012 | Tran ................... A61B 5/681 |
| | | 340/539.12 |
| 2012/0092157 A1* | 4/2012 | Tran ................... A61B 5/0077 |
| | | 340/539.12 |
| 2012/0143383 A1 | 6/2012 | Cooperrider et al. |
| 2012/0147780 A1 | 6/2012 | Gossain et al. |
| 2012/0155475 A1 | 6/2012 | Vasseur et al. |
| 2012/0166848 A1 | 6/2012 | Broad et al. |
| 2012/0191252 A1 | 7/2012 | Rockenfeller et al. |
| 2012/0192025 A1 | 7/2012 | Veillette |
| 2012/0200235 A1 | 8/2012 | Shuy et al. |
| 2012/0230696 A1 | 9/2012 | Pederson et al. |
| 2012/0260967 A1 | 10/2012 | Dwyer et al. |
| 2012/0284392 A1 | 11/2012 | Mayo |
| 2012/0290857 A1 | 11/2012 | Broad et al. |
| 2012/0307825 A1 | 12/2012 | Hui et al. |
| 2012/0327831 A1 | 12/2012 | Arendas |
| 2013/0000695 A1 | 1/2013 | Giri |
| 2013/0000696 A1 | 1/2013 | Giri |
| 2013/0002027 A1 | 1/2013 | Yu et al. |
| 2013/0009783 A1* | 1/2013 | Tran ....................... G16Z 99/00 |
| | | 340/669 |
| 2013/0021002 A1 | 1/2013 | Mayes |
| 2013/0051105 A1 | 2/2013 | Wang et al. |
| 2013/0063073 A1 | 3/2013 | Kawasaki et al. |
| 2013/0211291 A1* | 8/2013 | Tran ....................... A61B 5/369 |
| | | 600/595 |
| 2013/0234645 A1 | 9/2013 | Goei et al. |
| 2013/0324059 A1 | 12/2013 | Lee et al. |
| 2014/0077946 A1* | 3/2014 | Tran ....................... A61B 8/06 |
| | | 340/539.11 |
| 2014/0080406 A1 | 3/2014 | Freitas et al. |
| 2014/0086080 A1 | 3/2014 | Hui et al. |
| 2014/0104059 A1* | 4/2014 | Tran ....................... A61B 5/053 |
| | | 340/539.12 |
| 2014/0129163 A1 | 5/2014 | Betzner |
| 2014/0163425 A1* | 6/2014 | Tran ....................... G16H 15/00 |
| | | 600/595 |
| 2014/0216523 A1* | 8/2014 | Almogy ................. F24S 23/80 |
| | | 136/246 |
| 2014/0216528 A1 | 8/2014 | Vaidyanathan |
| 2014/0297206 A1 | 10/2014 | Silverman |
| 2014/0310243 A1 | 10/2014 | McGee et al. |
| 2014/0318007 A1* | 10/2014 | Hogan ................... A47G 7/044 |
| | | 119/51.01 |
| 2014/0368046 A1 | 12/2014 | MacWilliams et al. |
| 2015/0001945 A1 | 1/2015 | Estes |
| 2015/0016260 A1 | 1/2015 | Chow et al. |
| 2015/0021990 A1 | 1/2015 | Myer et al. |
| 2015/0086213 A1 | 3/2015 | Pederson et al. |
| 2015/0088253 A1 | 3/2015 | Doll et al. |
| 2015/0146655 A1 | 5/2015 | Hui et al. |
| 2015/0213709 A1 | 7/2015 | Miller et al. |
| 2015/0244306 A1 | 8/2015 | Estes |
| 2015/0260430 A1 | 9/2015 | Tamaura |
| 2015/0303710 A1 | 10/2015 | John |
| 2015/0338077 A1* | 11/2015 | Johnson ............. F21V 23/0442 |
| | | 362/249.02 |
| 2016/0085560 A1 | 3/2016 | Gourlay et al. |
| 2016/0094079 A1 | 3/2016 | Hiroki et al. |
| 2016/0109497 A1 | 4/2016 | Aiello et al. |
| 2016/0111918 A1 | 4/2016 | Benson |
| 2016/0112350 A1 | 4/2016 | Morrison et al. |
| 2016/0134906 A1 | 5/2016 | James et al. |
| 2016/0140834 A1* | 5/2016 | Tran ....................... A43B 3/48 |
| | | 340/539.11 |
| 2016/0141879 A1 | 5/2016 | Motsenbocker |
| 2016/0149805 A1 | 5/2016 | Hui et al. |
| 2016/0149890 A1 | 5/2016 | Ujiie et al. |
| 2016/0179994 A1 | 6/2016 | Levine et al. |
| 2016/0192126 A1 | 6/2016 | Dubey et al. |
| 2016/0198548 A1 | 7/2016 | Monaci et al. |
| 2016/0226305 A1 | 8/2016 | Estes |
| 2016/0226761 A1 | 8/2016 | Hui et al. |
| 2016/0286444 A1 | 9/2016 | Wang |
| 2016/0315506 A1 | 10/2016 | John |
| 2016/0320787 A1 | 11/2016 | Carlson |
| 2016/0322835 A1 | 11/2016 | Carlson et al. |
| 2016/0336623 A1 | 11/2016 | Nayar et al. |
| 2016/0344476 A1 | 11/2016 | Pederson et al. |
| 2016/0360965 A1* | 12/2016 | Tran ....................... A61B 8/565 |
| 2017/0025983 A1 | 1/2017 | Sills et al. |
| 2017/0064599 A1 | 3/2017 | Caine et al. |
| 2017/0079124 A1 | 3/2017 | Flinsenberg et al. |
| 2017/0168098 A1 | 6/2017 | Aiello et al. |
| 2017/0222923 A1 | 8/2017 | Hui et al. |
| 2017/0302218 A1 | 10/2017 | Janik |
| 2017/0310272 A1 | 10/2017 | Julian et al. |
| 2017/0347886 A1* | 12/2017 | Tran ....................... A61B 7/00 |
| 2018/0001985 A1 | 1/2018 | Zhang et al. |
| 2018/0063037 A1 | 3/2018 | Edwards |
| 2018/0069427 A1* | 3/2018 | Jiang ................... H02S 40/38 |
| 2018/0097467 A1 | 4/2018 | Sills et al. |
| 2018/0109458 A1 | 4/2018 | Chow et al. |
| 2018/0115185 A1 | 4/2018 | John |
| 2018/0128438 A1 | 5/2018 | Sreshta et al. |
| 2018/0131188 A1 | 5/2018 | Metcalfe |
| 2018/0184907 A1 | 7/2018 | Tran |

(56) References Cited

U.S. PATENT DOCUMENTS

| | | |
|---|---|---|
| 2018/0202224 A1 | 7/2018 | Kumar |
| 2018/0213461 A1 | 7/2018 | Grayson et al. |
| 2018/0226697 A1 | 8/2018 | Edwards |
| 2018/0227849 A1 | 8/2018 | Edwards |
| 2018/0268689 A1 | 9/2018 | Lewis |
| 2018/0269685 A1 | 9/2018 | Sugeno et al. |
| 2018/0302853 A1 | 10/2018 | Chandra et al. |
| 2019/0019632 A1 | 1/2019 | Rusling et al. |
| 2019/0027951 A1 | 1/2019 | Park et al. |
| 2019/0038133 A1* | 2/2019 | Tran ................ G08B 21/02 |
| 2019/0049968 A1 | 2/2019 | Dean et al. |
| 2019/0061885 A1 | 2/2019 | Baro et al. |
| 2019/0069003 A1* | 2/2019 | Panagos ........... H04N 21/23103 |
| 2019/0098725 A1 | 3/2019 | Sadwick et al. |
| 2019/0133303 A1 | 5/2019 | Thiel et al. |
| 2019/0137631 A1 | 5/2019 | Rayudu et al. |
| 2019/0159412 A1 | 5/2019 | Guidish et al. |
| 2019/0171221 A1 | 6/2019 | Minorics |
| 2019/0181678 A1 | 6/2019 | Jiang et al. |
| 2019/0230589 A1 | 7/2019 | Chandra et al. |
| 2019/0257686 A1 | 8/2019 | Popat |
| 2019/0259892 A1 | 8/2019 | Moslehl |
| 2019/0307328 A1* | 10/2019 | Tran ................ A61B 8/565 |
| 2019/0310637 A1* | 10/2019 | Dean ................ G05D 1/81 |
| 2019/0326501 A1 | 10/2019 | Gilbert et al. |
| 2019/0364492 A1 | 11/2019 | Azizi et al. |
| 2019/0367191 A1 | 12/2019 | Wasson et al. |
| 2019/0394654 A1 | 12/2019 | Gardner |
| 2020/0067314 A1 | 2/2020 | Metcalfe et al. |
| 2020/0077892 A1* | 3/2020 | Tran ................ G08B 21/0492 |
| 2020/0099336 A1 | 3/2020 | Monforte et al. |
| 2020/0112087 A1 | 4/2020 | Kulkarni et al. |
| 2020/0116320 A1 | 4/2020 | Sreshta et al. |
| 2020/0120513 A1 | 4/2020 | Cahillo-O'Brien et al. |
| 2020/0120575 A1 | 4/2020 | Cahillo-O'Brien et al. |
| 2020/0125157 A1 | 4/2020 | Kachare et al. |
| 2020/0169219 A1 | 5/2020 | Zhang et al. |
| 2020/0193730 A1 | 6/2020 | Gong |
| 2020/0205062 A1 | 6/2020 | Azizi et al. |
| 2020/0212707 A1* | 7/2020 | Edwards ............. H02J 7/342 |
| 2020/0213929 A1 | 7/2020 | Edwards et al. |
| 2020/0213930 A1 | 7/2020 | Edwards et al. |
| 2020/0321880 A1 | 10/2020 | Lee et al. |
| 2021/0083477 A1 | 3/2021 | Metcalfe et al. |
| 2021/0150241 A1 | 5/2021 | Fukutome et al. |
| 2021/0273471 A1 | 9/2021 | Syracuse et al. |
| 2022/0078694 A1* | 3/2022 | Edwards ............. H02S 40/30 |
| 2022/0115869 A1* | 4/2022 | Metcalfe ............. H02J 3/18 |
| 2022/0190600 A1* | 6/2022 | Metcalfe ............ G01R 29/18 |
| 2022/0209570 A1* | 6/2022 | Edwards ............ H02J 7/0068 |
| 2022/0334580 A1* | 10/2022 | Dean ................ A61G 5/04 |
| 2022/0366663 A1* | 11/2022 | Fukutome ........... H04N 25/77 |
| 2023/0155383 A1* | 5/2023 | Metcalfe ............. H02J 3/16 |
| | | 323/215 |
| 2023/0198261 A1* | 6/2023 | Lee ............... H02M 3/33584 |
| | | 320/140 |
| 2025/0044795 A1* | 2/2025 | Dean ................ G05D 1/0088 |

FOREIGN PATENT DOCUMENTS

| | | |
|---|---|---|
| KR | 2018-0020717 A | 2/2018 |
| WO | 2012/064906 A2 | 5/2012 |
| WO | 2017/199229 A1 | 11/2017 |

OTHER PUBLICATIONS

Notice of Allowance received for U.S. Appl. No. 17/528,120 dated Jun. 14, 2023, 15 pages.
Non Final Office Action received for U.S. Appl. No. 17/528,120 dated Feb. 21, 2023, 31 pages.
Non Final Office Action received for U.S. Appl. No. 18/469,020 dated Sep. 30, 2024, 58 pages.
Non Final Office Action received for U.S. Appl. No. 18/469,020 dated Apr. 28, 2025, 13 pages.
Notice of Allowance received for U.S. Appl. No. 18/469,020 dated Aug. 5, 2025, 13 pages.

* cited by examiner

SOLAR HYBRID BATTERY FOR POWERING NETWORK DEVICES OVER EXTENDED TIME INTERVALS

CROSS-REFERENCE TO RELATED APPLICATIONS

The present application is a continuation of United States application titled "SOLAR HYBRID BATTERY FOR POWERING NETWORK DEVICES OVER EXTENDED TIME INTERVALS," filed on Dec. 31, 2018, and having Ser. No. 16/237,554. The subject matter of this related application is hereby incorporated herein by reference.

BACKGROUND

Field of the Various Embodiments

Embodiments of the present invention relate generally to device network technology and, more specifically, to a solar hybrid battery for powering network devices over extended time intervals.

Description of the Related Art

A conventional wireless network includes a plurality of nodes configured to communicate with one another. In certain types of heterogeneous wireless networks, some nodes are coupled to a power grid and have continuous access to power (except during power outages), while other nodes that cannot be coupled to the power grid are powered by batteries. These battery-powered nodes have only a finite supply of battery power.

To manage the finite supply of battery power, some types of battery-powered nodes remain in a powered down state most of the time and power on only at intermittent intervals to perform various types of communications. For example, a battery-powered gas meter could power on communication hardware once per day in order to report metrology data collected during a previous 24-hour period. Conserving battery power in this manner allows such nodes to be deployed for long periods of time without having to replace the batteries. Other types of battery-powered nodes, however, need to remain continuously active and therefore cannot power down to conserve battery power. For example, a battery-powered relay typically needs to listen for transmissions on a continuous basis in order to relay those transmissions across the wireless mesh network.

An alternative approach to conserving battery power that is implemented by some battery-powered nodes, especially battery-powered nodes that need to remain continuously active, is to periodically recharge batteries using solar panels. For example, a battery-powered node that is deployed in an outdoor location could be configured with a solar panel that generates and stores power during the day to support node operations during the night. These types of nodes are referred to herein as "solar-powered nodes."

Solar-powered nodes are typically designed with a large battery and a small solar panel. The battery is usually designed to power the node for a number of consecutive days without needing to be recharged, and the solar panel is usually designed to charge the battery over the course of several sunny days. Accordingly, a general design principle for such systems s that the battery should be sized based on an estimate of how many consecutive cloudy days are likely to occur during normal operation. For example, many of these types of systems are designed to accommodate normal operations for fourteen consecutive cloudy days. This particular design approach suffers from several drawbacks.

First, a battery designed to power a node for numerous consecutive days typically has to be replaced frequently. For example, a conventional lead-acid battery that can power a node over a fourteen-day period typically needs to be replaced every five years. Many customers require nodes to have battery lives of twenty years or more, so designs where the batteries have to be replaced more frequently are not commercially viable. Further, a large battery designed to power a node for fourteen days can be very costly. In some cases, a large battery can cost ten times more than the node itself.

As the foregoing illustrates, what is needed in the art is a more effective way to power battery-powered nodes over long periods of time.

SUMMARY

Some embodiments include a system, comprising a network subsystem that consumes a first portion of power during a first time interval when performing network communications with one or more nodes included in a wireless network, and a power subsystem that is coupled to the network subsystem and includes a secondary power cell that stores the first portion of power, and a solar panel that, when exposed to a first level of irradiance during a second time interval, generates the first portion of power for storage in the secondary power cell, wherein the first time interval comprises an interval of continuous darkness and the second time interval comprises an interval of continuous daylight.

One technological advantage of the disclosed approach relative to the prior art is that, with the disclosed approach, the secondary cell need only power the node through one night before being fully recharged the following day. Accordingly, the secondary cell can have a sufficiently limited storage capacity that a small rechargeable battery with an operational lifetime exceeding 20 years can be used.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

In the following description, numerous specific details are set forth to provide a more thorough understanding of the various embodiments. However, it will be apparent to one of skilled in the art that the inventive concepts may be practiced without one or more of these specific details.

As noted above, some types of battery-powered nodes need to operate continuously over long intervals of time without replacement batteries, in some cases for over 20 years. Solar-powered nodes can operate for extended periods of time by recharging batteries using solar panels. However, solar-powered nodes are generally insufficient for extended usage because the batteries in these types of nodes cannot last for 20 years. In most cases, a conventional solar-powered node designed with a large battery and a small solar panel can operate for 5 years before a replacement battery is needed.

To address these issues, embodiments of the invention include a node that is powered by a solar hybrid battery system. The solar hybrid battery system includes a solar panel, a primary cell, and a secondary cell. The secondary cell includes only enough power storage to be capable of powering the node during the longest interval of darkness in the region where the node is deployed (also known as the winter solstice). The solar panel is sized relative to the secondary cell to be capable of fully recharging the secondary cell during the shortest daily interval of daylight in the region where the node is deployed, even under conditions of limited solar irradiance (e.g. due to cloud cover). The primary cell can charge the secondary battery if the node is shelved or malfunctioning to prevent the secondary cell from becoming overly depleted. The primary cell can also provide the node with additional power during times of peak demand or to perform status reports.

Figure 1:
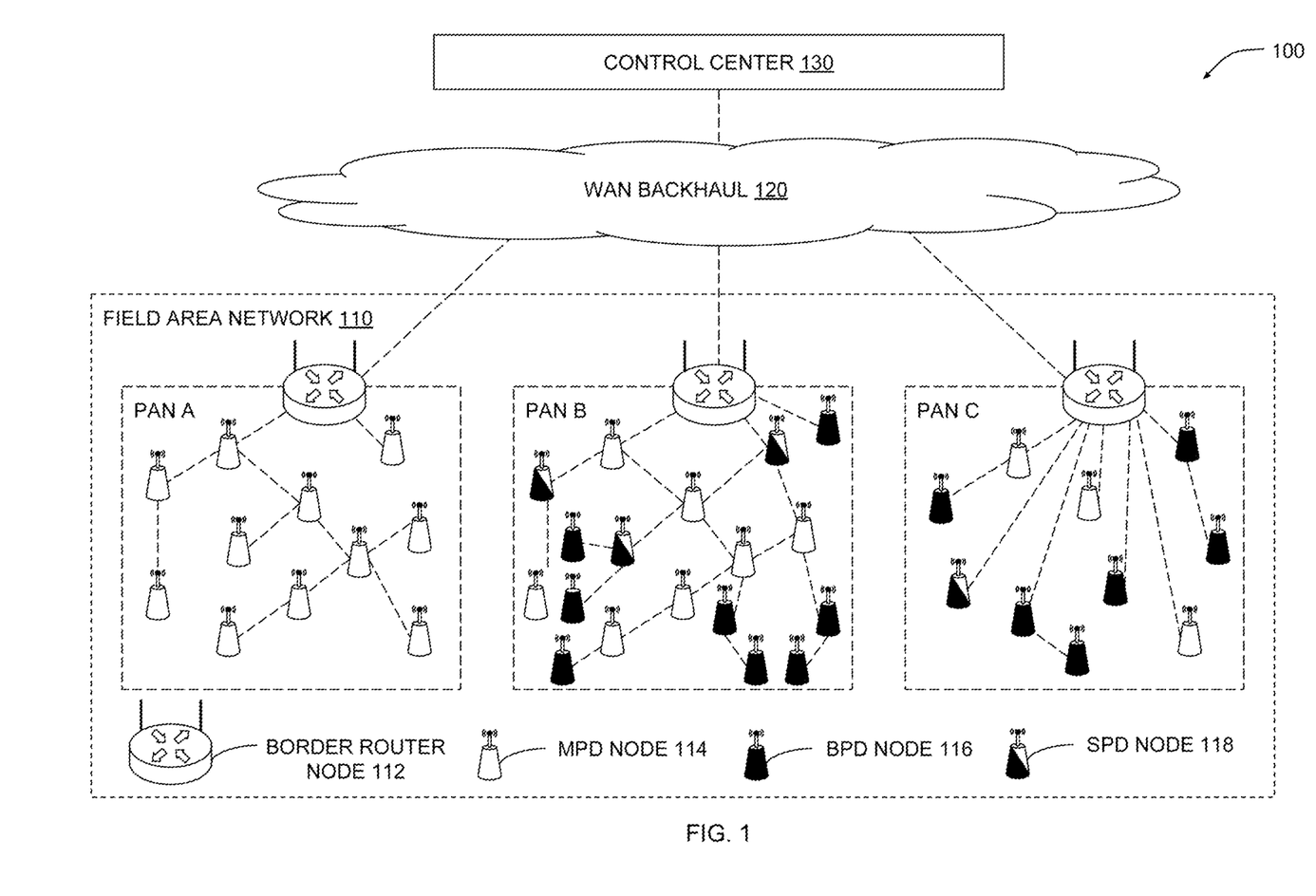
FIG. 1 illustrates a network system configured to implement one or more aspects of the present embodiments.

One technological advantage of the disclosed approach relative to the prior art is that, with the disclosed approach, the secondary cell need only power the node through one night before being fully recharged the following day. Accordingly, the secondary cell can have a sufficiently limited storage capacity that a small rechargeable battery with an operational lifetime exceeding 20 years can be used. Another technological advantage of the disclosed approach is that smaller secondary cells are relatively inexpensive compared to the larger battery cells used in conventional systems, thereby reducing the overall cost of the node. These technological advantages represent multiple technological advancements relative to prior art approaches System Overview FIG. 1 illustrates a network system configured to implement one or more aspects of the present embodiments. As shown, network system 100 includes a field area network (FAN) 110, a wide area network (WAN) backhaul 120, and a control center 130. FAN 110 is coupled to control center 130 via WAN backhaul 120. Control center 130 is configured to coordinate the operation of FAN 110.

FAN 110 includes personal area network (PANs) A, B, and C. PANs A and B are organized according to a mesh network topology, while PAN C is organized according to a star network topology. Each of PANs A, B, and C includes at least one border router node 112 and one or more mains-powered device (MPD) nodes 114. PANs B and C further include one or more battery-powered device (BPD) nodes 116 and one or more solar-powered device (SPD) nodes 118.

MPD nodes 114 draw power from an external power source, such as mains electricity or a power grid. MPD nodes 114 typically operate on a continuous basis without powering down for extended periods of time. BPD nodes 116 draw power from an internal power source, such as a battery. BPD nodes 116 typically operate intermittently and power down for extended periods of time in order to conserve battery power. SPD nodes 118 include solar panels that generate power from sunlight. SPD nodes 118 store generated power in secondary cells and draw power from those secondary cells to support node operations.

MPD nodes 114, BPD nodes 116, and SPD nodes 118 are coupled to, or included within, a utility distribution infrastructure (not shown) that distributes a resource to consumers. MPD nodes 114, BPD nodes 116, and SPD nodes 118 gather sensor data related to the distribution of the resource, process the sensor data, and communicate processing results and other information to control center 130. Border router nodes 112 operate as access points to provide MPD nodes 114, BPD nodes 116, and SPD nodes 118 with access to control center 130.

Any of border router nodes 112, MPD nodes 114, BPD nodes 116, and SPD nodes 118 are configured to communicate directly with one or more adjacent nodes via bi-directional communication links. The communication links may be wired or wireless links, although in practice, adjacent nodes of a given PAN exchange data with one another by transmitting data packets via wireless radio frequency (RF) communications. The various node types are configured to perform a technique known in the art as "channel hopping" in order to periodically receive data packets on varying channels. As known in the art, a "channel" may correspond to a particular range of frequencies. In one embodiment, a node may compute a current receive channel by evaluating a Jenkins hash function based on a total number of channels and the media access control (MAC) address of the node.

Each node within a given PAN may implement a discovery protocol to identify one or more adjacent nodes or "neighbors." A node that has identified an adjacent, neighboring node may establish a bi-directional communication link with the neighboring node. Each neighboring node may update a respective neighbor table to include information concerning the other node, including the MAC address of the other node as well as a received signal strength indication (RSSI) of the communication link established with that node.

Nodes may compute the channel hopping sequences of adjacent nodes to facilitate the successful transmission of data packets to those nodes. In embodiments where nodes implement the Jenkins hash function, a node computes a current receive channel of an adjacent node using the total number of channels, the MAC address of the adjacent node, and a time slot number assigned to a current time slot of the adjacent node.

Any of the nodes discussed above may operate as a source node, an intermediate node, or a destination node for the transmission of data packets. A given source node may generate a data packet and then transmit the data packet to a destination node via any number of intermediate nodes (in mesh network topologies). The data packet may indicate a destination for the packet and/or a particular sequence of intermediate nodes to traverse in order to reach the destination node. In one embodiment, each intermediate node may include a forwarding database indicating various network routes and cost metrics associated with each route.

Nodes may transmit data packets across a given PAN and across WAN backhaul 120 to control center 130. Similarly, control center 130 may transmit data packets across WAN backhaul 120 and across any given PAN to a particular node included therein. As a general matter, numerous routes may exist which traverse any of PANs A, B, and C and include any number of intermediate nodes, thereby allowing any given node or other component within network system 100 to communicate with any other node or component included therein.

Control center 130 includes one or more server machines (not shown) configured to operate as sources for, or destinations of, data packets that traverse within network system 100. The server machines may query nodes within network system 100 to obtain various data, including raw or processed sensor data, power consumption data, node/network throughput data, status information, and so forth. The server machines may also transmit commands and/or program instructions to any node within network system 100 to cause those nodes to perform various operations. In one embodiment, each server machine is a computing device configured to execute, via a processor, a software application stored in a memory to perform various network management operations.

Figure 2:
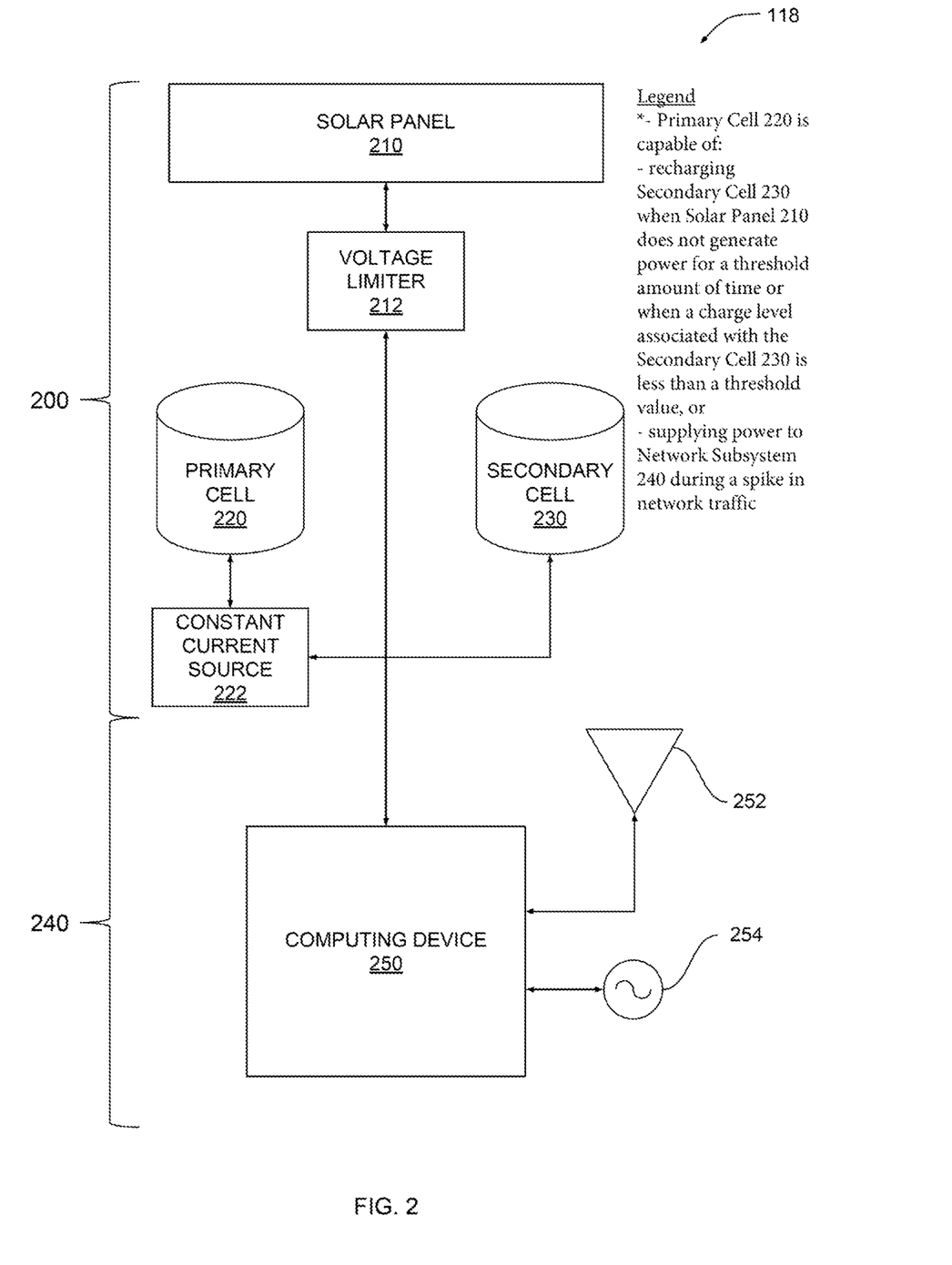
FIG. 2 illustrates a solar-powered node configured to transmit and receive data within the network system of FIG. 1, according to various embodiments.

Nodes may likewise include computing device hardware configured to perform processing operations and execute program code. Each node may further include various analog-to-digital and digital-to-analog converters, digital signal processors (DSPs), harmonic oscillators, transceivers, and any other components generally associated with RF-based communication hardware. FIG. 2 illustrates a power subsystem and a network subsystem that may be included in any of the SPD nodes 118 of network system 100.

Solar-Powered Device Node Design

FIG. 2 is a more detailed illustration of one of the solar-powered device (SPD) nodes of FIG. 1, according to various embodiments. As shown, an SPD node 118 includes a power subsystem 200 and a network subsystem 240. Power subsystem 200 includes a solar panel 210, a voltage limiter 212, a primary cell 220, a constant current source 222, and a secondary cell 230, coupled together. Primary cell 220 may be a Lithium Thionyl Chloride battery and secondary cell 230 may be an extended lifetime Lithium Ion battery, such as those manufactured by Tadiran, LTD. Network subsystem 240 includes a computing device 250, one or more transceivers 252, and an oscillator 254. Some or all of the SPD nodes 118 shown in FIG. 1 may include instances of power subsystem 200 and network subsystem 240.

Solar panel 210 is coupled to voltage limiter 212. Primary cell 220 is coupled to constant current source 222. Secondary cell 230 is coupled to voltage limiter 212 and constant current source 222. Computing device 250 is coupled to solar panel 210 via voltage limiter 212, to primary cell 220 via constant current source 222, and to secondary cell 230. Computing device 250 is also coupled to transceiver 252 and oscillator 254.

In operation, computing device 250, transceiver 252, and oscillator 254 draw power from secondary cell 230 to support the operation of SPD node 118. Computing device 250, transceiver 252, and oscillator 254 can also draw power from primary cell 220 to support the operation of the SPD node 118, although primary cell 220 may be omitted in some embodiments. Those operations include gathering metrology data from a utility line where the SPD node 118 is coupled, receiving data packets from other nodes, analyzing and/or processing data, transmitting data packets to other nodes, monitoring power generation of solar panel 210, and reporting status information to control center 130. Computing device 250 receives and/or transmits data via transceiver 252 based on timing signals generated by oscillator 254. Computing device 250 generally operates on a continuous basis and does not power down to conserve power during normal operations. Computing device 250 includes a processor that executes a software application to perform any of the node-oriented operations discussed herein.

During the day, solar panel 210 charges secondary cell 230. In particular, solar panel 210 converts sunlight into power and then stores this power in secondary cell 230. Voltage limiter 212 limits the voltage of that power to avoid damaging secondary cell 230. During the night, solar panel 210 does not charge secondary cell 230 and various node operations cause secondary cell 230 to deplete. Voltage limiter 212 prevents backflow of power from secondary cell 230 to solar panel 210 when solar panel 210 is unable to generate power, thereby preventing leakage of secondary cell 230 as well as damage to solar panel 210.

The storage capacity of secondary cell 230 and the power generation rate of solar panel 210 are determined to meet two specific design criteria. First, the storage capacity of secondary cell 230 is just sufficient or more than sufficient to power the SPD node 118 during the longest night of the year in the geographical location where the node is deployed. For example, secondary cell 230 could have a storage capacity that is 10% greater than the minimum storage capacity needed to power the SPD node 118 during the longest night of the year in the geographical location where the node is deployed. This approach can compensate for capacity fade associated with secondary cell 230. As referred to herein, the term "night" refers to a continuous interval of darkness associated with one or more solar days.

Second, the power generation rate of solar panel 210 is sufficient to both power the SPD node 118 and fully recharge secondary cell 230 during a day with lower than normal solar irradiance and/or the shortest day of the year in the geographical location where the node is deployed. For example, solar panel 210 could have a power generation rate that is sufficient to both power the SPD node 118 and fully recharge secondary cell 230 during a very cloudy and/or very short day. As referred to herein, the term "day" refers to a continuous interval of daylight associated with one or more solar days. A day with lower than normal solar irradiance may have an amount of solar irradiance that is 15% or less than the average amount of daytime solar irradiance in the region where the SPD node 118 is deployed.

Importantly, configuring secondary cell 230 and solar panel 210 based on the two design criteria described above allows a very small and inexpensive secondary cell 230 with a very long operational lifetime to be used. In some configurations, secondary cell 230 can have an operational lifetime of over 20 years. Accordingly, the disclosed techniques are well-suited for implementation in a variety of different battery-powered devices, beyond those associated with networks. For example, power subsystem 200 could be included in a Fast Pass device, a shipping container data logger, a G-shock and/or Global Positioning System (GPS) location logger, a parking occupancy sensor, a motion and/or presence detector, a thermostat, a light controller, a remote terminal unit, and so forth.

Because SPD node 118 can operate for extended periods of time without needing replacement batteries, the disclosed approach can significantly reduce operational overhead, thereby meeting customer demands. An example of how SPD node 118 charges and depletes secondary cell 230 compared to conventional systems is discussed in greater detail below in conjunction with FIGS. 3A-3B.

Figure 3A:
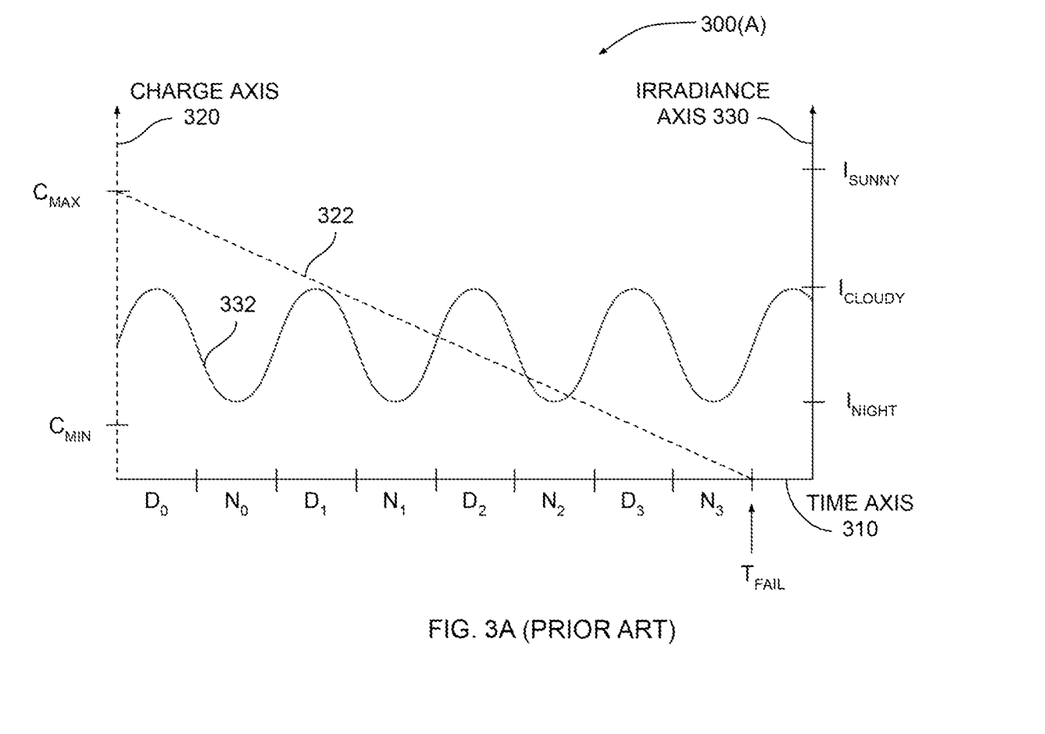
FIG. 3A illustrates how solar battery cells are charged and discharged in a conventional network device.
Figure 3B:
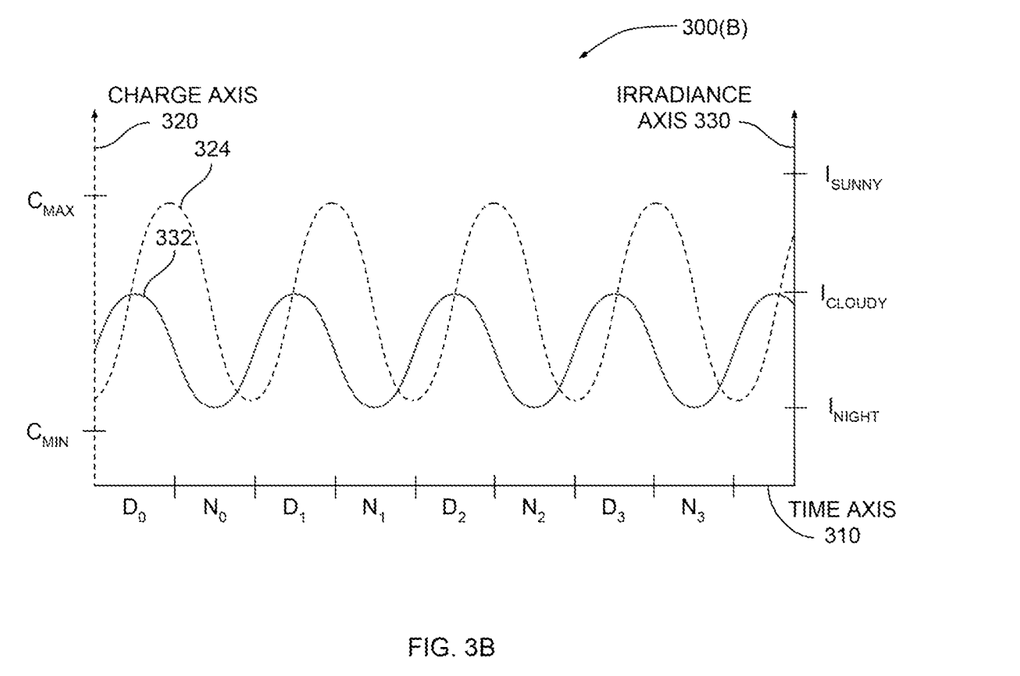
FIG. 3B illustrates how solar battery cells are charged and discharged in different network devices, according to various embodiments.

FIGS. 3A-3B illustrate how solar battery cells are charged and discharged in different network devices, according to various embodiments. As shown, each of graphs 300(A) and 300(B) shown in FIGS. 3A and 3B, respectively, include a time axis 310, a charge axis 320, and an irradiance axis 330. Graph 300(A) relates to a conventional solar-powered node, while graph 300(B) generally relates to SPD node 118 of FIG. 2.

Time axis 310 indicates an alternating sequence of day (D) and night (N) intervals, including $D_0$, $N_0$, $D_1$, $N_1$, $D_2$, $N_2$, $D_3$ and $N_3$. A given day/night pair generally corresponds to a 24-hour period of time. Charge axis 320 indicates a charge level associated with a given secondary cell and ranges from $C_{min}$ to $C_{max}$. $C_{min}$ is a minimum charge level beneath which the given secondary cell may become damaged and $C_{max}$ is a maximum charge level associated with the given secondary cell. Irradiance axis 330 indicates an irradiance level at a given solar panel, and ranges from $I_{night}$ through $I_{cloudy}$ to $I_{sunny}$. $I_{night}$ is the irradiance level at the given solar panel at night, $I_{cloudy}$ is the irradiance level at the given solar panel when cloud cover is present, and $I_{sunny}$ is the irradiance level at the given solar panel during a sunny day.

As shown in FIG. 3A, plot 322 indicates a charge level associated with a secondary cell that is configured to power a conventional node, and plot 332 indicates an irradiance level at a solar panel that is used to charge that secondary cell. As is shown, plot 332 fluctuates between $I_{night}$ and $I_{cloudy}$, indicating that several consecutive cloudy days have occurred. Under such circumstances, the solar panel included in the conventional node cannot charge the associated secondary cell and the charge level of that secondary cell decreases over time. When the charge level decreases beneath $C_{min}$, the secondary cell is damaged. When the charge level reaches zero at $T_{fail}$, the conventional node ceases to operate.

As shown in FIG. 3B, plot 324 indicates a charge level associated with secondary cell 230 of FIG. 2 when periodically charged by solar panel 210. As mentioned above in conjunction with FIG. 2, the storage capacity of secondary cell 230 and the power generation rate of solar panel 210 are configured so that solar panel 210 can power SPD node 118 and fully recharge secondary cell 230 over the course of any given day, including cloudy days. Accordingly, plot 324 indicates that the charge level of secondary cell 230 reaches $C_{max}$ after one day of charging even when the irradiance level is only $I_{cloudy}$. Plot 324 also indicates that SPD node 118 depletes secondary cell 230 nearly to $C_{min}$ but does not deplete secondary cell 230 so far as to cause damage. In one embodiment, $C_{min}$ may be the lowest operating voltage for any of the power-consuming elements of SPD node 118.

Referring generally to FIGS. 3A-3B, a comparison of graphs 300(A) and 300(B) reveals that conventional nodes are configured according to a fundamentally different design paradigm compared to SPD node 118. Specifically, a conventional node is designed to draw power from a secondary cell continuously and without replenishing that power over the course of a specific number of days that have low solar irradiance. In practice, conventional nodes are typically designed to operate without recharging secondary cells for at least fourteen cloudy days, beyond which those nodes cease to operate. By contrast, SPD node 118 is designed to meet the two design criteria mentioned above; first, that secondary cell stores just enough power to support node operations at night, and second, that the solar panel can fully recharge the secondary cell during only one cloudy day. These two design criteria represent a fundamental paradigm shift away from implementing small solar panels with large batteries and towards implementing larger solar panels with smaller batteries.

Charging and Discharging Secondary Cells During Short Intervals

Figure 4:
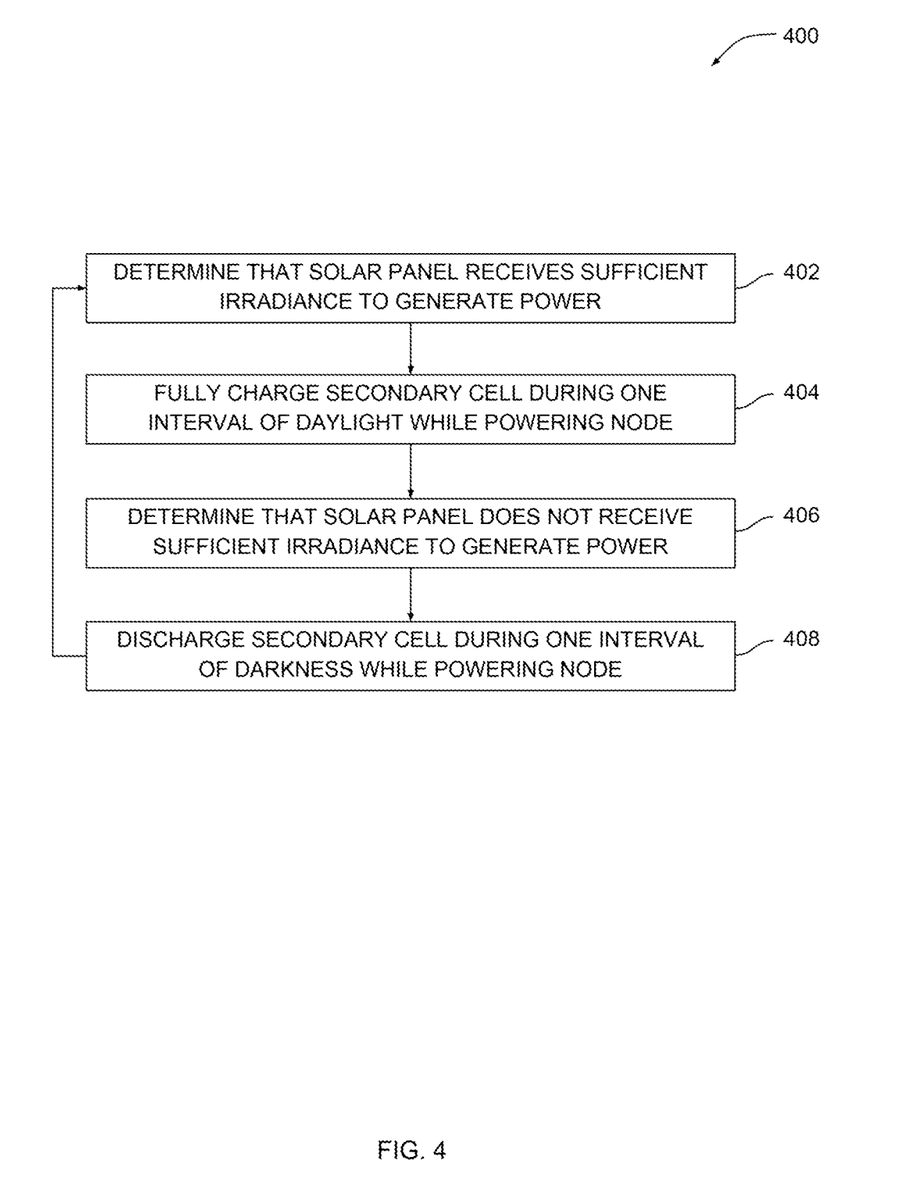
FIG. 4 is a flow diagram of method steps for charging and discharging a solar battery cell that powers a network device, according to various embodiments.

FIG. 4 is a flow diagram of method steps for charging and discharging a solar battery cell that powers a network device, according to various embodiments. Although the method steps are described in conjunction with the systems of FIGS. 1-3B, persons skilled in the art will understand that any system configured to perform the method steps in any order falls within the scope of the present invention.

As shown, a method 400 sets forth a repeating sequence of operations. SPD node 118 performs this sequence of operations during the daylight and darkness portions of a given 24-hour period. During the daylight portion, SPD node 118 performs steps 402 and 404 and fully charges secondary cell 230. During the darkness portion, SPD node 118 performs steps 406 and 408 and discharges secondary cell 230. The steps of the method 400 are described in greater detail below.

As shown, the method 400 begins at step 402, where voltage limiter 212 included in SPD node 118 of FIG. 2 analyzes the voltage load on solar panel 210 and determines that solar panel 210 receives sufficient irradiance to generate power. For example, voltage limiter 212 could determine that solar panel 210 generates power with a positive voltage value. Solar panel 210 is sized to generate power during the daylight portion of any given day with lower than normal solar irradiance. For example, solar panel 210 can generate power during very cloudy days and/or during very short days. In the context of this disclosure, the term "day" refers to a continuous interval of daylight associated with one or more solar days. A day with lower than normal solar irradiance may have an amount of solar irradiance that is 15% or less than the average amount of daytime solar irradiance in the region where SPD node 118 is deployed.

At step 404, voltage limiter 212 conducts power from solar panel 210 to secondary cell 230 to recharge secondary cell 230. The storage capacity of secondary cell 230 is sufficient to power SPD node 118 during the longest night of the year. Further, the rate of power generation provided by solar panel 210 is sufficient to both power SPD node 118 and fully charge secondary cell 230 during any given day of the year, including a cloudy day and/or the shortest day of the year. In one embodiment, the storage capacity of secondary cell 230 and the power generation rate of solar panel 210 are further determined based on the geographical location where SPD node 118 is deployed.

At step 406, voltage limiter 212 determines that solar panel 210 does not receive sufficient solar irradiance to generate power. For example, voltage limiter 212 could determine that solar panel 210 generates power with a negative voltage value instead of a positive voltage value. Solar panel 210 usually does not receive sufficient irradiance to generate power at night. If solar panel 210 does not receive sufficient irradiance to charge secondary cell 230, voltage limiter 212 restricts the flow of power to prevent solar panel 210 from depleting secondary cell 230. In the context of this disclosure, the term "night" refers to a continuous interval of darkness associated with one or more solar days.

At step 408, various elements included in SPD node 118 discharge secondary cell 230. For example, computing device 250 consumes power to execute software applications and process data, transceiver 252 consumes power to receive and transmit data, and oscillator 254 consumes power to generate timing signals. The storage capacity of secondary cell 230 is sufficient to support these various operations for an extended period of time, including the longest night of the year, as mentioned above.

SPD node 118 generally performs the method 400 over the course of one day/night interval associated with one or more solar days to charge and discharge secondary cell while maintaining ongoing node operations. This approach is fundamentally different compared to conventional techniques where a secondary cell depletes during several consecutive cloudy days and is then recharged during several consecutive sunny days.

In conjunction with performing the steps described above to charge and discharge secondary cell 230, SPD node 118 may also discharge primary cell 220 for various reasons. In one embodiment, primary cell 220 may operate as a failsafe mechanism to prevent secondary cell 230 from fully depleting and becoming damaged. For example, if SPD node 118 is shelved and solar panel 210 is not exposed to sunlight for some period of time, then solar panel 210 cannot charge secondary cell 230 and secondary cell 230 would eventually deplete entirely. In this situation, primary cell 220 would keep secondary cell 210 charged to prevent secondary cell 210 from fully depleting. Alternatively, if solar panel 210 is damaged and cannot charge secondary cell 230, then primary cell 220 can charge secondary cell 230 until solar panel 210 can be repaired. In another embodiment, SPD node 118 may draw power from primary cell 220 in order to support a spike in power consumption. For example, SPD node 118 could draw power from primary cell 220 in order to download a large firmware update. In various other embodiments, computing device 250 may draw power from primary cell 220 to provide various status updates to control center 130. For example, computing device 250 may report the status of secondary cell 230 to control center 130 using power derived from primary cell 220. Alternatively, computing device 250 can measure the voltage on solar panel 210 and report this voltage to control center 130 using power derived from primary cell 220.

Persons skilled in the art will understand that the disclosed approach can be implemented to power a wide variety of different components. For example, border router 112 and/or SPD node 118 included in FAN 110 of FIG. 1 can implement solar panel 210 in conjunction with secondary cell 230 to perform various network operations over long periods of time without needing replacement batteries. The disclosed techniques can also be implemented to power wireless access points, wireless relays, pole tilt sensors, gas meters, water meters, and any other technically feasible component that can be included in or coupled to wireless field area network 110.

In sum, a node within a wireless network is powered by a solar hybrid battery system. The solar hybrid battery system includes a solar panel, a primary cell, and a secondary cell. The secondary cell includes only enough power storage to be capable of powering the node during the longest daily interval of darkness in the region where the node is deployed. The solar panel is sized relative to the secondary cell to be capable of fully recharging the secondary cell during the shortest daily interval of daylight in the region where the node is deployed, even under conditions of limited solar irradiance (e.g. due to cloud cover). The primary cell can charge the secondary battery if the node is shelved or malfunctioning to prevent the secondary cell from becoming overly depleted. The primary cell can also provide the node with additional power during times of peak demand or to perform status reports, especially during periods of time when solar panel 210 does not generate power.

One technological advantage of the disclosed approach relative to the prior art is that, with the disclosed approach, the secondary cell need only power the node through one night before being fully recharged the following day. Accordingly, the secondary cell can have a sufficiently limited storage capacity that a small rechargeable battery with an operational lifetime exceeding 20 years can be used. Another technological advantage of the disclosed approach is that smaller secondary cells are relatively inexpensive compared to the larger battery cells used in conventional systems, thereby reducing the overall cost of the node. These technological advantages represent multiple technological advancements relative to prior art approaches.

1. Some embodiments include a system, comprising a network subsystem that consumes a first portion of power during a first time interval when performing network communications with one or more nodes included in a wireless network, and a power subsystem that is coupled to the network subsystem and includes a secondary power cell that stores the first portion of power, and a solar panel that, when exposed to a first level of irradiance during a second time interval, generates the first portion of power for storage in the secondary power cell, wherein the first time interval comprises an interval of continuous darkness and the second time interval comprises an interval of continuous daylight.

2. The system of clause 1, wherein the first time interval corresponds to a darkness portion of the winter solstice at a first location.

3. The system of any of clauses 1-2, wherein the second time interval corresponds to a daylight portion of the winter solstice at a first location.

4. The system of any of clauses 1-3, wherein the first level of irradiance is equal to about fifteen percent of an average level of solar irradiance at a first location.

5. The system of any of clauses 1-4, wherein the secondary power cell has an operational lifetime of at least 20 years.

6. The system of any of clauses 1-5, wherein the power subsystem further includes a voltage limiter that is coupled between the solar panel and the secondary cell, and wherein the voltage limiter electrically isolates the solar panel from the secondary power cell during the first time interval and restricts a voltage level associated with the first portion of power during the second time interval.

7. The system of any of clauses 1-6, wherein the power subsystem further includes a primary cell that recharges the secondary cell when the solar panel does not generate any power for a threshold amount of time.

8. The system of any of clauses 1-7, wherein the power subsystem further includes a primary cell that supplies power to the network subsystem during a spike in network traffic.

9. The system of any of clauses 1-8, wherein the solar panel, when exposed to the first level of irradiance during the second time interval, further generates a second portion of power that is consumed by the network subsystem during the second time interval.

10. Some embodiments include a system, comprising a network subsystem that performs network communications with one or more nodes included in a wireless network during a daylight interval, a power subsystem that is coupled to the network subsystem and includes a secondary power cell that stores a first portion of power, and a solar panel that fully recharges the secondary power cell while powering the network subsystem during the first daylight interval, wherein the solar panel is exposed to about fifteen percent of an average level of solar irradiance in a first location during the first daylight interval, and wherein the first portion of power is great enough to power the network subsystem during a first darkness interval that occurs subsequently to the first daylight interval.

11. The system of clause 10, wherein the first daylight interval corresponds to the winter solstice at the first location and the first darkness interval corresponds to the winter solstice at the first location.

12. The system of any of clauses 10-11, wherein the secondary power cell has an operational lifetime of at least 20 years.

13. The system of any of clauses 10-12, wherein the power subsystem further includes a voltage limiter that is coupled between the solar panel and the secondary cell, wherein the voltage limiter electrically isolates the solar panel from the secondary power cell during the first darkness interval and restricts a voltage level associated with powering the network subsystem during the first daylight interval.

14. The system of any of clauses 10-13, wherein the solar panel generates the first portion of power to fully recharge the secondary power cell while generating a second portion of power for powering the network subsystem when exposed to the about fifteen percent of the average level of solar irradiance in the first location during the first daylight interval, wherein the first portion of power is greater than the second portion of power.

15. The system of any of clauses 10-14, wherein the power subsystem further includes a primary cell that recharges the secondary cell when the solar panel does not generate any power for a threshold amount of time.

16. The system of any of clauses 10-15, wherein the power subsystem further includes a primary cell that recharges the secondary cell when a charge level associated with the secondary cell is less than a threshold value.

17. The system of any of clauses 10-16, wherein the power subsystem further includes a primary cell that supplies power to the network subsystem when the network subsystem downloads a firmware update.

18. The system of any of clauses 10-17, wherein the network subsystem includes a computing device that monitors a first power generation rate associated with the solar panel and reports the first power generation rate to a control center via a wireless network.

19. Some embodiments include a solar battery subsystem, comprising a secondary power cell, and a solar panel that, when exposed to a first irradiance level, fully recharges the secondary power cell during a first daylight interval while powering a network subsystem, wherein the first irradiance level is about fifteen percent of an average irradiance level at a location where the solar battery subsystem is deployed.

20. The system of clause 19, wherein the network subsystem depletes the secondary power cell during a first darkness interval that occurs subsequently to the first daylight interval, and wherein the first darkness interval comprises a darkness portion of the winter solstice at the location where the solar battery subsystem is deployed.

Any and all combinations of any of the claim elements recited in any of the claims and/or any elements described in this application, in any fashion, fall within the contemplated scope of the present invention and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module" or "system." In addition, any hardware and/or software technique, process, function, component, engine, module, or system described in the present disclosure may be implemented as a circuit or set of circuits. Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A network device for installation at a geographic location, comprising:
   a rechargeable power cell having a first maximum storage capacity that stores a storage energy that is approximately 10 percent greater than a first amount of energy, wherein the first amount of energy comprises energy that is necessary to power the network device when performing network communications with one or more network devices over a wireless network during a longest night of a year at the geographic location without the rechargeable power cell being fully depleted; and
   a solar panel having a power generation rate that generates, within every day at the geographic location for which solar irradiance is 15% of an average amount of daytime solar irradiance at the geographic location, a second amount of energy that is sufficient to power the network device plus generate the first amount of energy.

2. The network device of claim 1, wherein the first amount of energy is insufficient to power the network device during two consecutive nights of the year at the geographic location.

3. The network device of claim 1, wherein the rechargeable power cell has an operational lifetime of at least 20 years.

4. The network device of claim 1, further comprising a voltage limiter that is coupled between the solar panel and the rechargeable power cell; wherein the voltage limiter is configured to:
   electrically isolate the solar panel from the rechargeable power cell during nights at the geographic location, and
   restrict a voltage level associated with the generated second amount of energy.

5. The network device of claim 1, further comprising a primary power cell configured to supplement power provided by the rechargeable power cell and the solar panel.

6. A system comprising:
   a network subsystem configured to communicate with one or more network devices over a wireless network; and
   a power subsystem comprising:
      a rechargeable battery having a maximum storage capacity that stores a storage energy that is approximately 10 percent greater than a first amount of energy, wherein the first amount of energy comprises an energy that is necessary to power the network subsystem when performing network communications during a longest night of a year in a geographic region where the system is located without the rechargeable battery becoming fully depleted; and
      a solar power generation subsystem having a power generation rate that generates, within every day at the geographic region for which solar irradiance is 15% of an average amount of daytime solar irradiance in the geographic region where the system is located, a second amount of energy that is sufficient to power the network subsystem plus generate the first amount of energy.

7. The system of claim 6, wherein the solar power generation subsystem comprises one or more solar panels.

8. The system of claim 6, wherein the first amount of energy is insufficient to power the network subsystem during two consecutive nights of the year in the geographic region.

9. The system of claim 6, wherein the power subsystem comprises a primary battery configured to supply energy for at least one of:
   recharging the rechargeable battery when the solar power generation subsystem does not generate power for a threshold amount of time;
   powering the network subsystem during a temporary increase in power consumption by the network subsystem;
   powering the network subsystem when the network subsystem is downloading a firmware update;
   powering the network subsystem to prevent the rechargeable battery from becoming fully depleted; or
   powering the network subsystem when the network subsystem sends one or more status updates to another system.

10. An energy supply system, comprising:
    one or more solar panels; and
    a rechargeable power cell having a first maximum storage capacity that stores a storage energy that is approximately 10 percent greater than a first amount of energy, wherein the first amount of energy comprises energy that is necessary to power a node when performing network communications with one or more network devices in a wireless network during a longest expected night at a location of the one or more solar panels without fully depleting the rechargeable power cell;
    wherein the one or more solar panels have a power generation rate that generates, within every day at the location of the one or more solar panels for which solar irradiance is 15% of an average amount of daytime solar irradiance at the location of the one or more solar panels, a second amount of energy that is sufficient to power the node plus generate the first amount of energy.

11. The energy supply system of claim 10, wherein the first amount of energy is insufficient to power the node during two consecutive nights at the location of the one or more solar panels.

12. The energy supply system of claim 10, further comprising an isolator coupled between the one or more solar panels and the rechargeable power cell, the isolator being configured to electrically isolate the one or more solar panels from the rechargeable power cell when the one or more solar panels are not generating power.

13. The energy supply system of claim 10, further comprising a voltage limiter coupled between the one or more solar panels and the rechargeable power cell, the voltage limiter being configured to control a voltage of the power generated by the one or more solar panels.

14. The energy supply system of claim 10, further comprising a primary power cell configured to supplement power provided to the node by the rechargeable power cell and the one or more solar panels.

* * * * *